(12) United States Patent
Hutchings

(10) Patent No.: US 7,178,178 B2
(45) Date of Patent: Feb. 20, 2007

(54) INDUCTIVE PERIPHERAL

(75) Inventor: Brent Mark Hutchings, Ramona, CA (US)

(73) Assignee: Dimension One Spas, Vista, CA (US)

( * ) Notice: Subject to any disclaimer, the term of this patent is extended or adjusted under 35 U.S.C. 154(b) by 0 days.

(21) Appl. No.: 10/987,477

(22) Filed: Nov. 12, 2004

(65) Prior Publication Data
US 2006/0101567 A1  May 18, 2006

(51) Int. Cl.
*E04H 4/00* (2006.01)
(52) U.S. Cl. ............................... 4/496; 4/559; 4/541.1
(58) Field of Classification Search .................. 4/496, 4/559, 541.1–541.6; 335/296, 299
See application file for complete search history.

(56) References Cited

U.S. PATENT DOCUMENTS

| | | | | |
|---|---|---|---|---|
| 3,849,771 A | * | 11/1974 | Applin | 340/624 |
| 4,761,724 A | * | 8/1988 | Brown et al. | 363/21.07 |
| 4,942,352 A | * | 7/1990 | Sano | 320/134 |
| 4,982,461 A | * | 1/1991 | Mikiya et al. | 4/541.3 |
| 5,245,221 A | | 9/1993 | Schmidt et al. | |
| 5,422,519 A | * | 6/1995 | Russell | 307/104 |
| 6,301,128 B1 | | 10/2001 | Jang et al. | |
| 2002/0008973 A1 | | 1/2002 | Boys et al. | |

FOREIGN PATENT DOCUMENTS

| | | |
|---|---|---|
| DE | 20115097 | 1/2002 |
| WO | 2004097866 | 11/2004 |

* cited by examiner

*Primary Examiner*—Khoa D. Huynh
(74) *Attorney, Agent, or Firm*—Fish & Richardson P.C.

(57) ABSTRACT

A peripheral device for a spa makes use of inductance for power and/or control. In an embodiment, a peripheral device includes a magnetic field source positioned in a region on an externally facing side of a spa shell and configured to generate a first magnetic field. The peripheral device includes a peripheral module, such as a light or other feature. The module includes an inductor configured to generate a second magnetic field based on the first magnetic field, a converter configured to convert the second magnetic field into a current, and a peripheral feature configured to be powered by the current.

13 Claims, 1 Drawing Sheet

INDUCTIVE PERIPHERAL

BACKGROUND

Many electronic peripheral devices used in harsh or wet environments are connected to a data and/or power source through a shell, which can be any type of wall or panel. For example, spas, hot tubs and pools (each hereafter referred to as a "spa") have increasingly more peripheral features that enhance the user experience, such as programmable lighting, control sensors and actuators. However, the protection, isolation and insulation of physical wires, contacts, and plug connections needed to transmit power and signals for such peripherals must conform to strict and sophisticated safety requirements.

Previously, mechanical contacts have been required to connect these peripherals to the spa controller or power source. Such mechanical contacts are susceptible to dirt, corrosion, wear, contamination, and damage. Additionally, mechanical contacts may require a watertight seal at each connection point, which is costly and problematic for manufacture, maintenance and replacement. A typical peripheral module requires two or three conductors or wires for data, and at least two conductors or wires dedicated to the power supply. Each of these conductors or wires can occupy its own breach path through the shell separating the data source/power supply from the peripheral device.

A particular problem arises with a peripheral such as lighting that is located below the water line of a spa. Repairing or replacing such peripheral modules requires a time-consuming process, including at least draining and drying of the pool or spa, replacing the module, creating and verifying a watertight seal of the mechanical contacts of the module, and then refilling the spa.

Replacement or repair of any peripheral module requires either front or rear access. Both front and rear access increase the manufacturing cost and complexity. Front access of an underwater peripheral necessitates draining the water to a level below the peripheral fixture. Rear access of an underwater peripheral requires a "light tunnel" or access panel to be situated behind the peripheral. Front access increases cost of operation if the peripheral needs to be frequently replaced or repaired. Rear access limits the placement of the peripheral.

Both front and rear access requires that the shell or body of the spa be penetrated to install the peripheral. Therefore, where the peripheral penetrates the shell or body, a watertight seal is required, which is also costly and problematic for manufacture, maintenance and replacement.

SUMMARY

This document discloses a peripheral module that does not require a "light tunnel", access panel or water from a spa to be drained for servicing. In addition, a peripheral module system is disclosed that is advantageous for design and/or aesthetic purposes, and allows for the free placement of the peripheral fixture anywhere in the spa.

A peripheral device for a spa includes a magnetic field source positioned in a region on an externally facing side of a spa shell and configured to generate a first magnetic field. The peripheral device includes a peripheral module. The peripheral module include an inductor configured to generate a second magnetic field based on the first magnetic field, a converter configured to convert the second magnetic field into a current, and a peripheral feature configured to be powered by the current.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
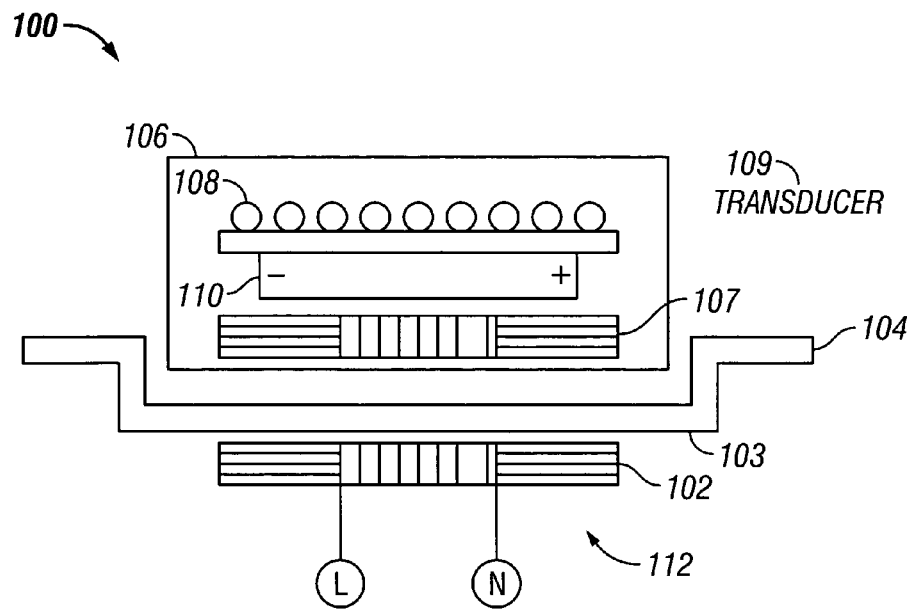
FIG. 1 shows an exemplary embodiment peripheral module system.

FIG. 1. shows an exemplary embodiment peripheral module system 100. The system 100 includes a peripheral module 106. The peripheral module 106 can be any electronic peripheral, and can be self-contained with a peripheral feature 108 and/or enclosed within a housing. In the exemplary embodiment, the peripheral feature 108 includes a bank of light emitting diodes (LEDs) for programmatic lighting under water. Other peripheral features can include audio, video, security, control, other features or any combination thereof. Each peripheral module 106 is configured to be mounted in proximity to a designated "base" 102. The base 102 is associated with a region 103 in a shell 104. The shell 104 can be a spa shell, a door, a panel, or any other solid surface, and is substantially thin and breach-free. In a specific embodiment, the region 103 of the shell 104 is below a waterline of a spa.

The base 102 includes a first inductor 112 such as a coil that uses a current to induce a magnetic field. The inductor 112 includes a conductor such as a wire that cuts through the lines of a magnetic flux, inducing a current in the conductor. In a specific embodiment, the base 102 generates an alternating magnetic field by utilizing a coil of wire (with or without a material core). The peripheral module 106 includes a second inductor 107 which, when the peripheral module 106 is placed in proximity to the corresponding base 102, encounters the alternating magnetic field. The second inductor 107 includes its own conductor such as a coil that cuts the lines of flux, inducing an alternating voltage (AC) and a therefore a current which can be utilized by the peripheral module and feature. The peripheral module 106 includes a converter 110, such as a battery, for converting the magnetic field energy from the second inductor into a current for the peripheral feature 108. The converter 110 can include any number of capacitors, resistors, or other electronic components for converting magnetic field energy into current.

The interacting lines of flux from both fields of the first and second inductors 112 and 107 can act as a bidirectional bridge passing inductive energy between the base 102 and the peripheral module 106 through the shell 104. Thus, in addition to the one-way application of power from the base 102 to the peripheral module 106, data (prescribed voltage and/or current signals) can be transmitted from the base 102 to the peripheral module 106, or from the peripheral module 106 to the base 102 and on to a system controller or other peripheral module.

The peripheral module 106 may be secured by any of a variety of means. Two exemplary embodiments include attachment either through magnetic coupling directly through the shell 104 or within a gasketed "press-fit" insert. The embodiments disclosed herein are not limited to the spa/hot tub/pool shell industry but may be also be applied, without limitation, to aquariums, recreational vehicle and/or boat lighting or other powered peripheral needs where exposure to harsh and particularly wet environments necessitate maintenance of a watertight (or environmentally protected) seal.

In the exemplary embodiment, the peripheral module 106 and/or the base 102 can include circuitry to convert inductive energy to a unique and/or proprietary voltage signal. This current generated by the second inductor 107 can then transmit enough power to drive the peripheral feature, such as a light for example. The peripheral module 106 can include a transducer 109 to convert the magnetic field of the second inductor 107 into current for the peripheral features. The peripheral module 106 can include circuitry for audio, capacitive, inductive, infrared, proximity, vibration, acceleration, strain, photoelectric, magnetic, capacitive, ultrasonic, and fiber-optic devices, as well as other control or communication devices, sensors, switches, and transducers or any combination thereof 109. Based on the passive inductive principles described above, the contact-less peripheral system can transmit both power and data across a breach-less physical shell, i.e. a spa shell, a glass or steel pane, etc. The peripheral system 100 can support multiple remote peripheral modules, without having to physically wire the remote modules to the system controller or power supply.

Using such an inductive coil as a power source, a peripheral, such as a light, could be located anywhere within the spa since neither rear nor front access is necessary. The primary coil (interior wiring and coil) is solid state and may be covered by additional manufacturing processes such as fiberglass reinforcement or foam filling since there is no need of access (light tunnel or access panel) for servicing. The peripheral also may be placed above or below the waterline of the spa since repair or replacement does not necessitate draining the water level down to the peripheral.

Figure 2:
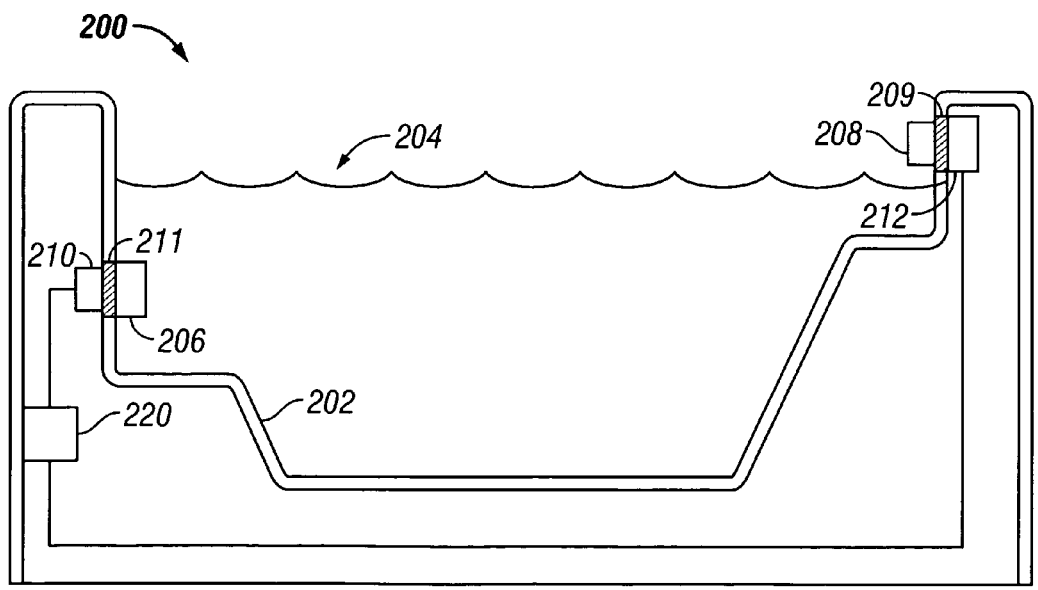
FIG. 2 illustrates one exemplary application for inductive peripherals.

FIG. 2 illustrates one exemplary application for inductive peripherals according to the various embodiments disclosed herein. The exemplary application includes a spa 200 having a spa shell 202. The spa 200 is filled with water, forming a waterline 204. The spa 200 includes bases 210 and 212 coupled with a first side of the spa shell 202 (facing away from the water), which forms a base region 209, 211 within the spa shell 202 corresponding to the location of the respective base.

Each base 210, 212 is associated with a peripheral module 206, 208. The peripheral module 206 is configured to be located below the waterline 204, while the peripheral module 208 is configured for positioning above the waterline 204. Each module is exposed to harsh elements and wet conditions. Each base 210 and 212 receives data and/or control signals either directly from a system controller or wirelessly 220, depicted as being located within the spa shell 202, although the system controller 220 may also be located remotely from the spa 200.

The bases 210 and 212 and designated peripheral module(s) 206 and/or 208 can be configured to communicate exclusively with each other, and therefore no false data is encountered. Performance is not degraded by interference from objects, bodies, jewelry, etc., present in an area proximate to the peripheral system. Because of this exclusive mating, the system controller 220 can detect that a peripheral module is positioned properly with respect to its base or, absent altogether, operating improperly.

Replacement of the peripheral modules 206 below the waterline requires simply reaching down to the appropriate base region, removing the module 206, and pressing a replacement module in its place. Furthermore, modules can be interchangeable.

Although a few embodiments have been described in detail above, other modifications are possible. Other embodiments may be within the scope of the following claims.

The invention claimed is:

1. A system comprising;
   a spa including a spa shell:
   a magnetic field source positioned in a region on an externally facing side of the spa shell and configured to generate a magnetic field; and
   an electronic module configured to be positioned on an internally facing side of the spa shell proximate to the region, and having a mechanism configured to inductively couple with the magnetic field source via the magnetic field passing through the spa shell to generate a current for the electronic module.

2. A system in accordance with claim 1, wherein the magnetic field source includes an inductive coil.

3. A system in accordance with claim 1, wherein the mechanism includes an inductive coil.

4. A module comprising:
   a mechanism configured to inductively couple with a magnetic field source via a magnetic field generated by the source and passing through a breach-free region of a water-tight barrier to generate a current; and
   a feature configured to be powered by the current,
   wherein the module is configured to attach to the water-tight barrier opposite the magnetic field source.

5. The module in accordance with claim 4, wherein the mechanism includes an inductive coil.

6. The module in accordance with claim 4, wherein the feature includes an electronic component controllable by the current.

7. The module in accordance with claim 4 further comprising a converter configured to convert the generated current into direct current.

8. The module in accordance with claim 4, wherein the module is configured to attach to the water-tight barrier through a magnetic coupling.

9. A device, comprising:
   a magnetic field source configured to generate a magnetic field, the source configured to be attached to a region on a first side of a spa shell; and
   a module configured to be attached proximate to the region on a second side of the spa shell opposite the first side, the module comprising:
   a mechanism configured to inductively couple with the magnetic field source via a magnetic field generated by the source and passing through the shell to generate a current; and
   a feature configured to be powered by the current.

10. The device in accordance with claim 9, wherein the magnetic field source includes an inductive coil.

11. The device in accordance with claim 9, wherein the mechanism includes an inductive coil.

12. The device in accordance with claim 9, wherein the module includes a converter configured to convert the generated current into a direct current.

13. The device in accordance with claim 9, wherein the feature includes an electronic component controllable by the current.

* * * * *